United States Patent [19]
Dash

[11] Patent Number: 5,324,137
[45] Date of Patent: Jun. 28, 1994

[54] CRYOGENIC METHOD AND SYSTEM FOR REMEDIATING CONTAMINATED EARTH

[75] Inventor: J. Gregory Dash, Seattle, Wash.

[73] Assignee: University of Washington, Seattle, Wash.

[21] Appl. No.: 19,085

[22] Filed: Feb. 18, 1993

[51] Int. Cl.⁵ .................... B09B 5/00; E02D 3/115
[52] U.S. Cl. ........................ 405/128; 405/130; 588/249
[58] Field of Search ............. 405/128, 129, 130, 131, 405/258; 588/249

[56] References Cited

U.S. PATENT DOCUMENTS

| | | | |
|---|---|---|---|
| 4,860,544 | 8/1929 | Krieg et al. | 62/45.1 |
| 4,966,493 | 10/1990 | Rebhan | 405/128 |
| 4,974,425 | 12/1990 | Krieg et al. | 62/45.1 |
| 4,998,848 | 3/1991 | Hansen | 405/128 |
| 5,050,386 | 9/1991 | Krieg et al. | 405/130 X |
| 5,106,232 | 4/1992 | Metzer et al. | 405/128 |

OTHER PUBLICATIONS

Cary et al., "Salt and Water Movement in Unsaturated Frozen Soil," Soil Science Society of America Proceedings, vol. 36, No. 4, pp. 549–555.
Dash, J. G., "Thermomolecular Pressure in Surface Melting: Motivation for Frost Heave," Science, vol. 246, pp. 1591–1593.
Gross, et al., "Recent Experimental Work on Solute Redistribution at the Ice/Water Interface. Implications for Electrical Properties and Interface Processes," Journal de Physique, vol. 48, Supplement 3, pp. 527–529.
Hallet, "Solute Redistribution in Freezing Ground," Proceedings of the Third International Conference on Permafrost, pp. 86–91.
Hofmann et al., "Redistribution of Soil Water and Solutes in Fine and Coarse Textured Soils After Freezing," Proceedings of the International Symposium on Frozen Soil Impacts on Agricultural, Range & Forest Lands, Special Report 90-1, pp. 263–270.
Iskander, "Effect of Freezing on the Level of Contaminants in Uncontrolled Hazardous Waste Sites," Special Report 86-19, U.S. Army Corps of Engineers, pp. 1–33.
Sullivan, Jr. et al., "Comparison of Numerical Simulations with Experimental Data for a Prototype Artificial Ground Freezing," Proceedings of the International Symposium on Frozen Soil Impacts on Agriculture, Range, and Forest Lands, Special Report 90-1, pp. 36–43.

Primary Examiner—David H. Corbin
Attorney, Agent, or Firm—Lappin & Kusmer

[57] ABSTRACT

An advancing freeze front is established in a porous region adjacent to or within contaminated earth. A flow of contaminated liquid phase water migrates toward the freeze front and a concentration of impurities is established in front of the advancing freeze front. When the freeze front reaches a collection zone, at least a portion is melted and the resultant water bearing concentrated impurities is collected and removed. This process may be repetitively performed.

35 Claims, 7 Drawing Sheets

CRYOGENIC METHOD AND SYSTEM FOR REMEDIATING CONTAMINATED EARTH

BACKGROUND OF THE DISCLOSURE

The present invention is in the field of hazardous waste control and more particularly relates to remediation of contaminated earth.

Toxic substance migration in the Earth poses an increasing threat to the environment, and particularly to ground water supplies. Such toxic substance migration may originate from a number of sources, such as surface spills (e.g., oil, gasoline, pesticides, and the like), discarded chemicals (e.g., PCB's, heavy metals), nuclear accident and nuclear waste (e.g., PCB's, solvents, methane gas). The entry of such hazardous materials into the ecosystem, and particularly the aquifer system, is well known to result in serious health problems for the general populace.

In recognition of such problems, there have been increasing efforts by both private environmental protection groups and governmental agencies, which taken together with increasing governmentally imposed restrictions on the disposal and use of toxic materials, to address the problem of long term, or permanent, safe storage of hazardous wastes, and to clean up existing hazardous waste sites.

There are many prior art techniques used to contain hazardous wastes, or other contaminants, in the ground. The most effective techniques appear to be those disclosed in U.S. Pat. Nos. 4,860,544 and 4,974,425, incorporated by reference herein, assigned to the assignee of the present invention. Generally, in accordance with the latter techniques, a frozen earth barrier, or two or more of such barriers, are established about the region containing the hazardous waste in situ. Those barriers are effective to contain, and thus prevent the migration of the enclosed hazardous waste, or other contaminants.

Once the contaminants have been contained, and even in cases where there is no containment, it is important to be able to remediate the contaminated earth. In the prior art, remediation is achieved by removing the contaminated earth to a remote site where the contaminants may be separated from the earth by conventional separation techniques. The most effective and safe approach for removal of contaminated earth for subsequent remediation is disclosed in U.S. Pat. No. 5,050,386, incorporated by reference herein, assigned to the assignee of the present invention. Generally, in accordance with an approach disclosed in that patent, the contaminated earth is frozen and then the periphery of sub-regions is thawed so that the generally frozen sub-regions may be easily removed from the site, like individual ice cubes from a tray of cubes. That approach is particularly effective where the contaminants are hazardous to humans, such as earth contaminated by radioactive waste. Even as the "cubes" are removed from the earth, a mist may be applied to the frozen cubes, which on contact freezes to establish a particulate-containing ice shell about the cube. This approach is effective for safely removing contaminated earth for remotely performed remediation.

However, it is desirable to minimize the need to transport the contaminated earth from both safety standpoints and economic standpoints. The best solution would be to remediate contaminated earth in situ, either contained as by the above noted frozen earth barrier techniques, or uncontained. In that case there would be less attendant cost, and improved safety risk factors.

Accordingly, it is an object of the present invention to provide an improved method and apparatus for remediating contaminated earth.

Another object is to provide an in situ method and apparatus for remediating contaminated earth.

Yet another object is to provide an improved contaminated earth remediation method and system that is economic and efficient to install and operate.

SUMMARY OF THE INVENTION

The present invention is a method and system for remediating a region containing contaminated earth. The method and system of the invention utilizes repeated sweeps of a freeze-front (i.e., a liquid-solid phase interface) through a moist, porous transfer medium (which may be adjacent to the region-to-be-remediated, or which may be the region-to-be-remediated itself) in a manner concentrating the contaminants from that region at a location where they may be removed. Generally, a central heat transfer assembly is disposed within the medium. That heat transfer assembly cools the medium disposed about it in a manner establishing an increasing-volume frozen sheath about the heat transfer assembly. As the sheath grows in size, a freeze-front is established that advances, or sweeps, across the medium, from the locus of the heat transfer assembly and eventually to a peripheral collection zone. In accordance with known principles, as the freeze-front advances across the medium, contaminant-bearing water in the unfrozen portion of the region-to-be-remediated is transported to the unfrozen side at the freeze-front (i.e., the liquid-solid phase interface).

When the water freezes, excluding the contaminants, it causes the freeze-front to advance across the region. After the freeze-front has advanced to the collection zone, with the result that water bearing a high concentration of contaminants is located at that zone, the sheath is melted, for example, by selectively operating heat sources located at or near that zone. The resultant water, bearing a high concentration of contaminants, is then collected and removed. Following removal of the contaminated water, the contaminants may be separated from the water, and the relatively pure water may be injected back into the earth, preferably in the transfer medium and/or the region-to-be-remediated and a freeze-front may again be swept across the medium to reduce even further the contaminant level in the region.

In the event there is only minimal water in the medium and/or region prior to freeze-front sweep, water may be injected into the earth. The entire cyclical freeze-front sweep/defrost/extract process may be performed on contaminated regions that are unconfined, or such regions that are confined, such as by frozen earth barriers of the type disclosed in the incorporated references.

In embodiments of the invention, the contaminant-concentrating feature of the invention may be combined with various methods of contaminated earth removal (with or without peripheral frozen earth contaminant barriers) to efficiently remove contaminants from the earth. Also, the invention may be used to merely cleanse a large region of the Earth, without collection of the displaced contaminants, but rather with the use of contaminant containing techniques such as those taught in U.S. Pat. Nos. 4,860,544 and 4,974,425. The contaminants may be contained indefinitely, while the cleansed region of the Earth is available for use.

BRIEF DESCRIPTION OF THE DRAWING

The foregoing and other objects of the invention, the various features thereof, as well as the invention itself, may be more fully understood from the following description, when read together with the accompanying drawings, in which:.

DESCRIPTION OF THE PREFERRED EMBODIMENTS

In accordance with the present invention, a freeze-front is repetitively swept across a porous region in or adjacent to a region-to-be-remediated. As each freeze-front sweeps across, the contaminants on the liquid-side of the liquid-solid phase interface are drawn to and concentrated ahead of, and transported with, the advancing freeze-front, by controlling the motion of the freeze-fronts, concentrated contaminants are steered to locations where they may be conveniently removed, preferably after the frozen region at that location is thawed.

The migratory physical effects associated with the melting and freezing of moisture in the ground have been known for many years. These effects take place over a range of temperatures lower than the freezing point in moist soils and other granular and porous media. In these media, water does not completely freeze at the normal 0° C. transition temperature of pure water; instead, the water freezes progressively over a range of temperatures, and does not freeze completely until the temperature is lowered to less than about −35° C. The persistent liquid is in the form of a thin film at the interfaces between the ice and the soil grains and between the individual crystallites of ice. In situations where the temperature is not uniform, this liquid tends to migrate toward lower temperatures. When the ground moisture is impure, the impurities are carried along with the flowing liquid. The present invention establishes such conditions, so that a directed flow of contaminated liquid phase water migrates to a freeze-front. At the freeze-front, the water becomes frozen to cause the freeze-front to advance; however, the impurities tend to be excluded from the ice at the front, and under slow controlled growth conditions, the exclusion is nearly complete.

Figure 1:
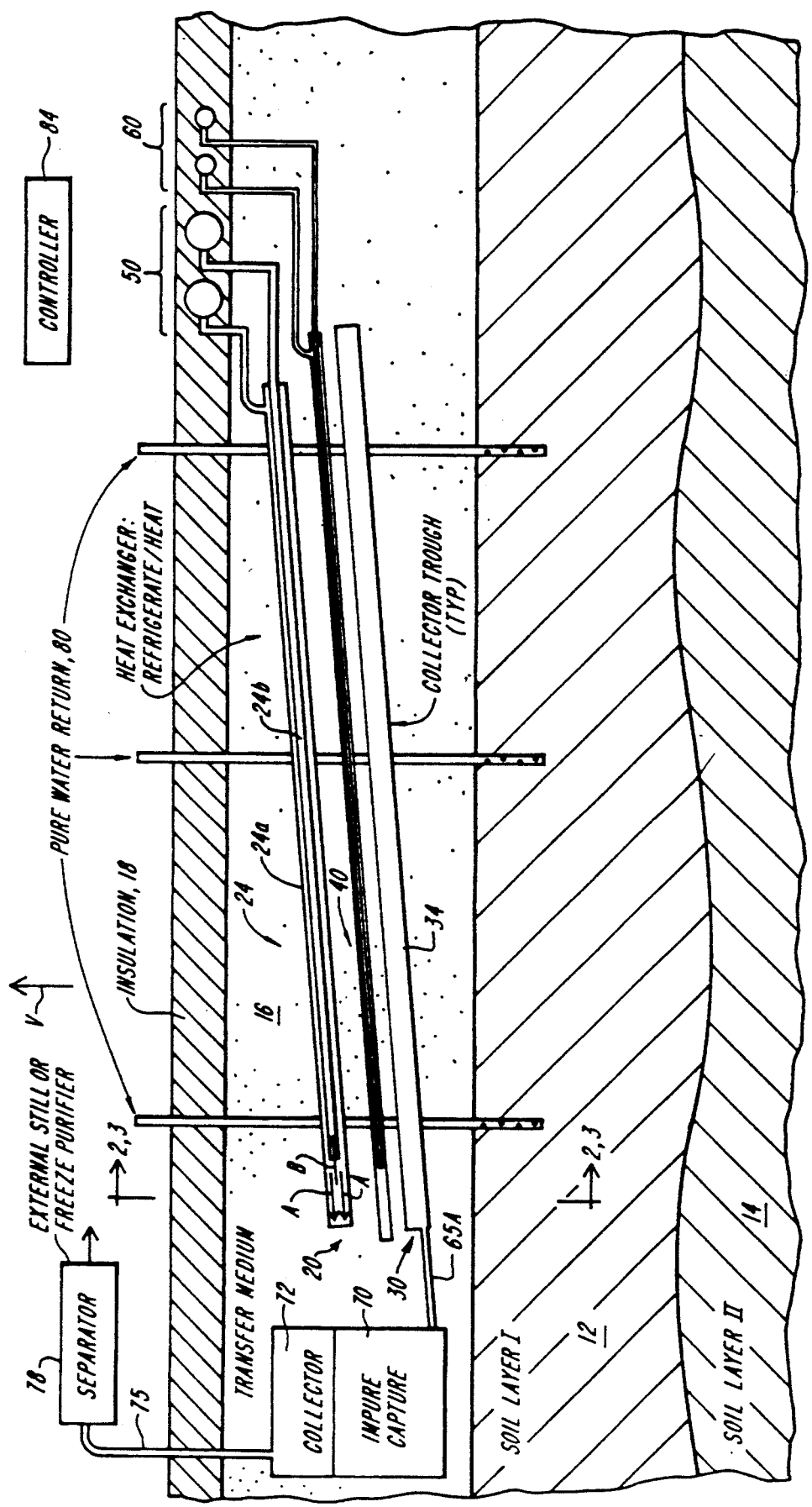
FIG. 1 shows in a sectional diagramatic form a remediation system that operates in accordance with the invention.
Figure 2:
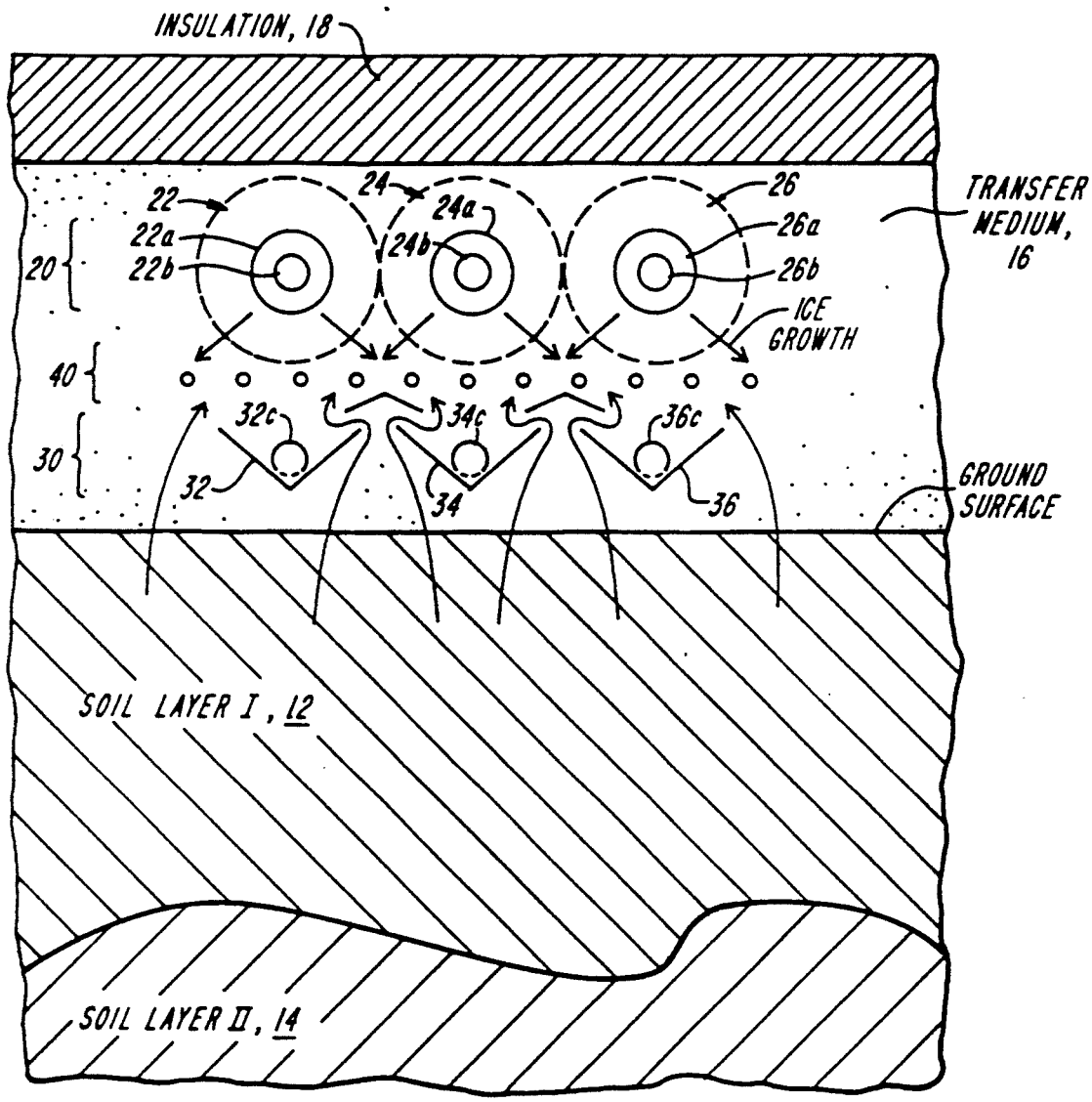
FIG. 2 shows a sectional view along lines 2,3—2,3 of the system of FIG. 1 and illustrates the refrigeration phase of the operation of that system.
Figure 3:
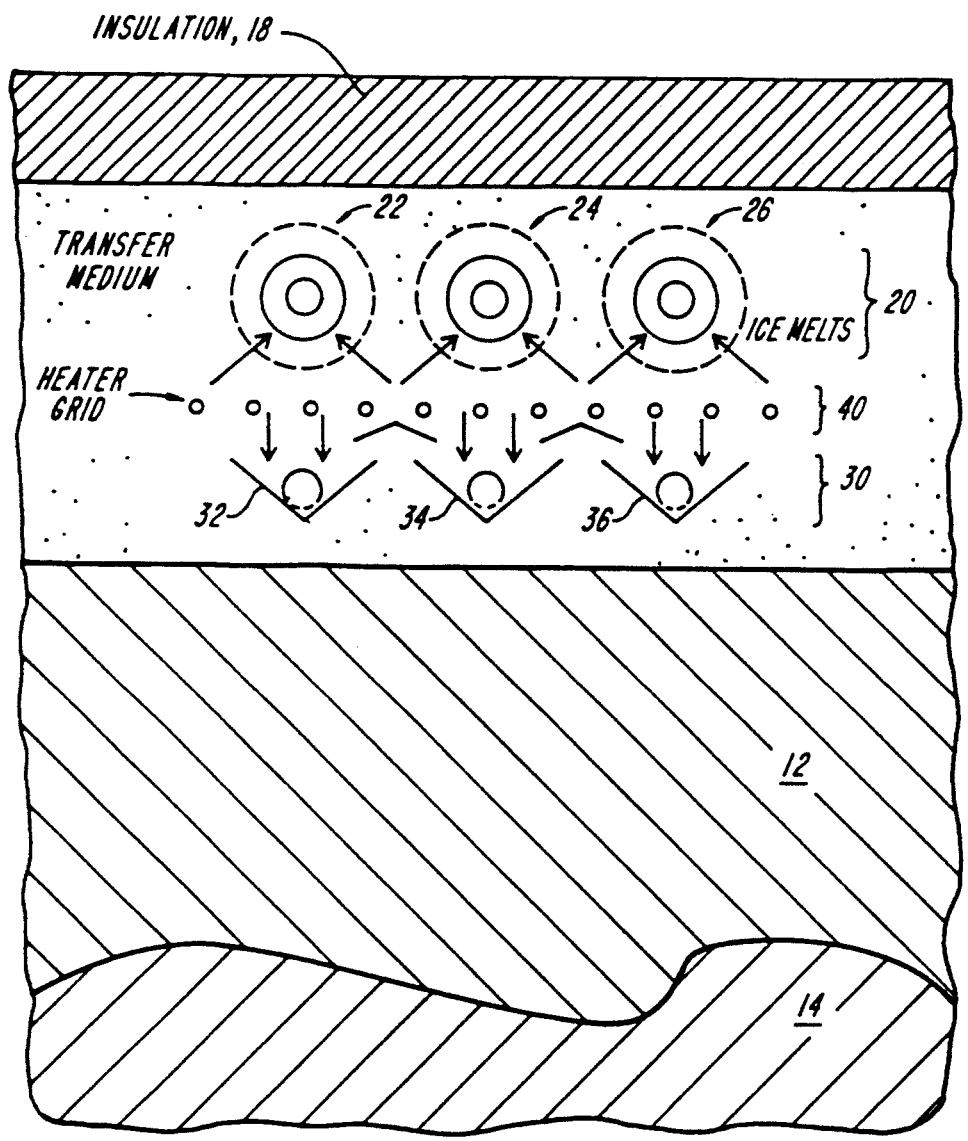
FIG. 3 shows a sectional view along lines 2,3—2,3 the system of FIG, 1 and illustrates the heating phase of the operation of that system.

An exemplary, a system 10 embodying the invention is shown in FIGS. 1-3. The system 10 is adapted to remove contaminants from a surface or sub-surface soil layer. In this example, a contaminated earth layer 12 overlies an uncontaminated layer 14. The system 10 includes a porous transfer layer 16 positioned on top of the contaminated layer 12. By way of example, the transfer layer 16 may be fine silt earth. A thermal insulator layer 18 overlies the transfer layer 16. By way of example, the thermal insulator layer 18 may be polystyrene foam, sawdust, sand, or other thermal insulating material.

The system 10 further includes a substantially planar array 20 of three elongated heat exchangers 22, 24, and 26. The heat exchangers 22, 4, 26 are generally parallel, with the array 20 having a slight tilt (the right end of the array 20, as illustrated, is higher than the left end of the array 20). That array 20 is disposed in the transfer layer 16. In other forms of the invention, different numbers of heat exchangers may be used. Also, other than strict parallel alignment, and strict planar configurations, may be used. All of such configurations are considered to be equivalent to, and within the definition of the term "planar array" as used herein.

The exchangers 22, 24 and 26 are generally parallel and lie in a plane which is sloped with respect to the local vertical V. Each heat exchanger of array 20 is a set of concentric pipes, including an outer pipe (denoted with suffix "a") and an inner pipe (denoted with suffix "b").

A corresponding planar array 30 of three elongated collector troughs 32, 34 and 36 is disposed generally parallel to and beneath the array 20 of heat exchangers, with each collector trough having a V-shaped cross-section transverse to its principal areas, and extending along and beneath an associated one of the heat exchangers 22, 24, and 26. Each collector trough has a perforated collection pipe (denoted by suffix c) extending along its vertex. An array of two inverted elongated V-shaped troughs 38 and 39 are disposed to span the gaps between the edges of adjacent troughs in the array 30. Other collection trough configurations may also be used provided those troughs are positioned to capture down-flowing water in the medium 16.

A planar array 40 of elongated parallel heater elements is disposed between, and generally parallel to, the arrays 20 and 30. Each heater element of array 40 is a set of concentric pipes.

The heat exchange pipes of array 20 are coupled at their uppermost ends to a manifold 50 which is coupled to a supply of heat exchange fluid. The heat exchange fluid may be selectively controlled to be hot or cold, as described below. The heat exchange pipes are connected So the heat exchange fluid is directed down the toroidal regions between the inner and outer pipes (as indicated by arrow A) and up the cylindrical region within the inner pipe (as indicated by the arrow B).

The pipes of the heater elements of array 40 are similarly coupled at their uppermost ends to a manifold 60 which coupled to a source of heat exchange fluid. The heat exchange fluid may be selectively controlled to be hot or relatively cold as described below. The concentric pipes of array 40 are coupled to direct the heat exchange fluid "down" the annular region between the pipes and "up" the cylindrical region within the inner pipe.

The lowermost ends of the collector troughs are coupled by a collector manifold 65 (exemplified by pipe 65A in FIG. 1) to a reservoir in collector 70. A pump assembly 72 is connected to collector 70, to permit pumping of water from the reservoir of collector 70 by way of an output pipe 75 to a separator apparatus 78, such as an external still or freeze purifier. The separator 78 separates the contaminants from the water and returns the pure water to the transfer layer 16 by way of an array 80 of vertically extending perforated pipes.

In operation, for cases where the soil in layer 12 is moist and the transfer layer 16 is moist, a controller 84 commences a refrigeration phase (illustrated in FIG. 2) in which cold heat exchange fluid is driven through manifold 50 and through the array 20, while the fluid in array 40 is maintained relatively cool. The temperature of the fluid and the flow rate in array 20 is controlled so that increasing volume ice sheaths are established outside each heat exchanger. The sheaths are indicated by the broken line circles in FIG. 2 and the growth of those sheaths is indicated by the arrows passing through the broken lines. In response to the cold freeze-front at the peripheral surface of the sheath, ground water, including contaminants, from soil layer 12 migrates upward from layer 12 into the transfer medium 16 and toward the freeze front. The flow of this water is indicated by the curved arrows in FIG. 2. In the illustrated embodiment, the refrigeration phase is terminated (by stopping the flow of cold heat exchange fluid) when the ice sheath extends to the limits, i.e., the collection zone, indicated by the broken line circles in FIG. 2.

The controller 84 then commences a heating phase, illustrated in FIG. 3. In this phase, controller 84 establishes a flow of hot heat exchange fluid through the array 40. As a result of this flow, the peripheral regions of the ice sheaths (i.e., near to where the high concentration of contaminants resides) begins to melt (indicated by the inward arrows through the broken circles in FIG. 3). The liquid phase water, along with the concentrated contaminants, is then gravity-driven (indicated by the downward straight arrows in FIG. 3) to the collector troughs of array 30, where that concentrated contaminated water runs off through the troughs via collector manifold 65 to the reservoir of collector 70. That water is then pumped out via pipe 75 by pump 72 for separation at separator 78.

In a latter portion of the heater phase, controller 84 establishes a flow of relatively warm heat exchange fluid through manifold 50 and array 20. This flow melts the remainder of the ice sheaths, resulting in a run-off of relatively contaminant-free water to reservoir 70. The heating phase is now complete.

Following completion of the heating phase, the controller 84 may repeat the two phase operation again to pass the freeze-front formed by the peripheral surfaces of the ice sheaths through the transfer layer 16 and then melt that freeze-front and collect the run-off.

The above embodiment illustrates the invention configured for removing contaminants from a surface layer of earth, where the system 10 is disposed within a transfer layer above the region-to-be-remediated. This approach is preferred when it is hazardous to perform excavating at the site. Alternatively, the system 10 could be positioned directly within the surface soil layer 12, but that would required trenching to establish the various elements of system 10 directly in the region-to-be-remediated.

Figure 4:
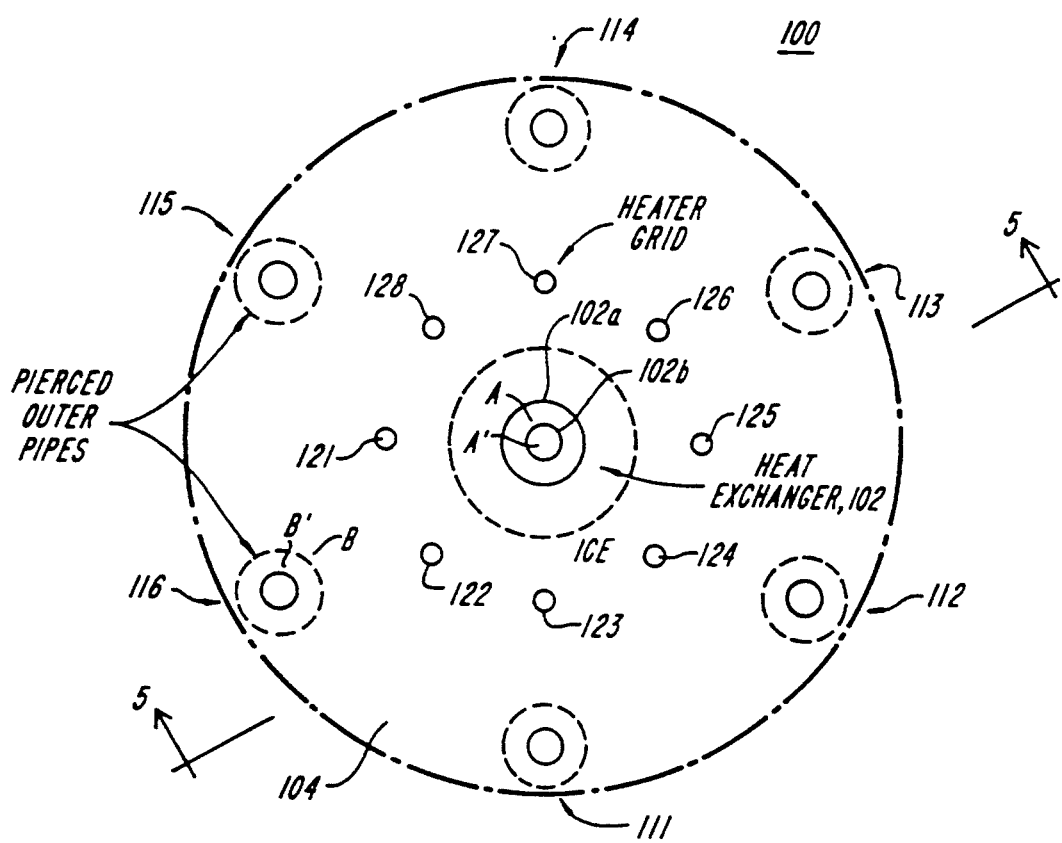
FIG. 4 shows in a top plan diagramatic form an alternative remediation system that operates in accordance with the invention.
Figure 5:
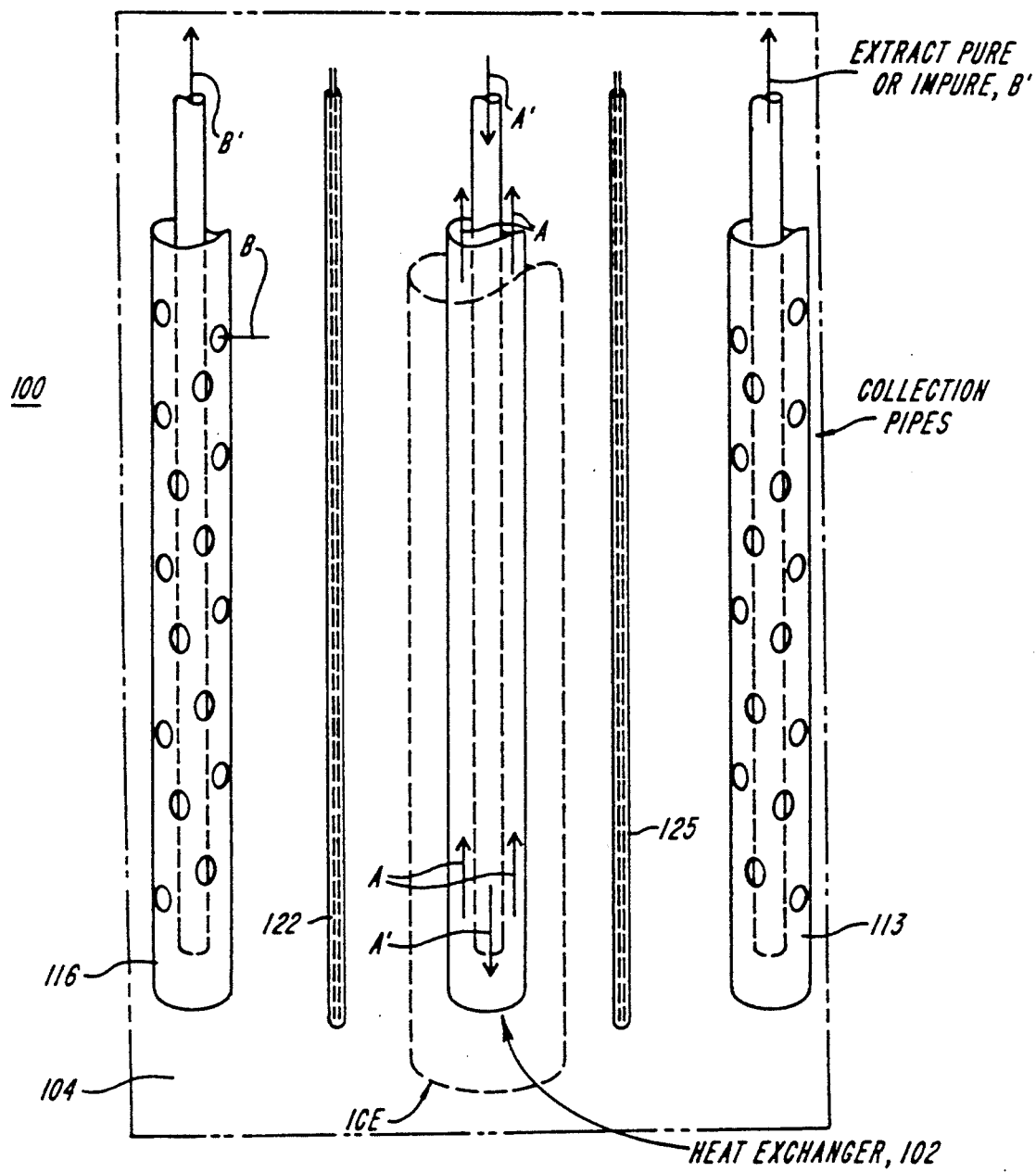
FIG. 5 shows in perspective form a side view of a portion of the system of FIG, 4.

An alternative form of the invention is shown in FIGS. 4 and 5 in which a freeze-front sweep is established directly in the region-to-be-remediated, but wherein substantially no excavation is required. A system 100, illustrated in FIGS. 4 and 5, includes an elongated heat exchanger assembly 102 which extends directly into a generally cylindrical region-to-be-remediated 104 (denoted by dash-dot lines in FIGS. 4 and 5). The heat exchanger 102 is a vertically-oriented set of coaxial pipes 102a and 102b which are similar to the coaxial pipes 22a and 22b of heat exchanger 22 of the embodiment of FIGS. 1-3.

A circular array of six parallel collector elements 111-116 is disposed vertically about the heat exchanger 102 at the lateral surface of the region 104. Each of elements 111-116 includes a perforated outer pipe disposed about a coaxial inner pipe. In alternative embodiments, different numbers of collector elements may be used, with differing inter-collector spacings.

A circular array of eight heater elements 121-126 are disposed vertically between the heat exchanger 102 and the array of collector elements 111-116. In alternative embodiments, different numbers of heating elements may be used, also with differing inter-element spacings. Each heater element is a substantially vertically oriented set of coaxial pipes which are 'similar to the coaxial pipes of the heater elements of array 40 of the embodiment of FIGS. 1-3.

Although not shown in FIGS. 4 and 5, the heat exchanger 102 is coupled via a manifold to a heat exchange fluid source in a manner similar to heat exchangers of the embodiment of FIGS. 1-3. Similarly, the heating elements 121-128 are coupled via a manifold to a heat exchange fluid source in a manner similar to the heating elements of array 40 of the embodiment of FIGS. 1-3.

In operation, a controller controls the flow rate and temperature of heat exchange fluid in the respective manifolds to accomplish operation of the system 100 which is similar to that of system 10 described above. That is, during a refrigeration cycle, an increasing volume ice sheath is established about heat exchanger 102 so that a freeze-front sweeps across the volume 104, concentrating contaminants ahead of (i.e., outward of) that freeze-front. Then, during a heating cycle, the controller first causes melting near the periphery of the sheath and the resultant contaminant-bearing water flows through the perforated pipes of collector elements 111-116. That water is pumped out through the central pipes of those elements. Then, hot heat exchange fluid is driven through heat exchanger 102 so that the remainder of the ice sheath melts, returning relatively pure water to the region 104.

Then, the controller repeats the cycle to establish another sweep of a freeze-front across the region 104. This cycle is repeated until a desired level of remediation is attained. The system illustrated in FIGS. 4-5 operates to establish an outwardly advancing freeze-front (from element 102 to collectors 111-116). In other forms of the invention having a similar structure, the peripheral elements 111-116 may be used to establish an inwardly advancing freeze-front directed to element 102 which would operate as a collector of the "focused" flow of contaminants.

Figure 6:
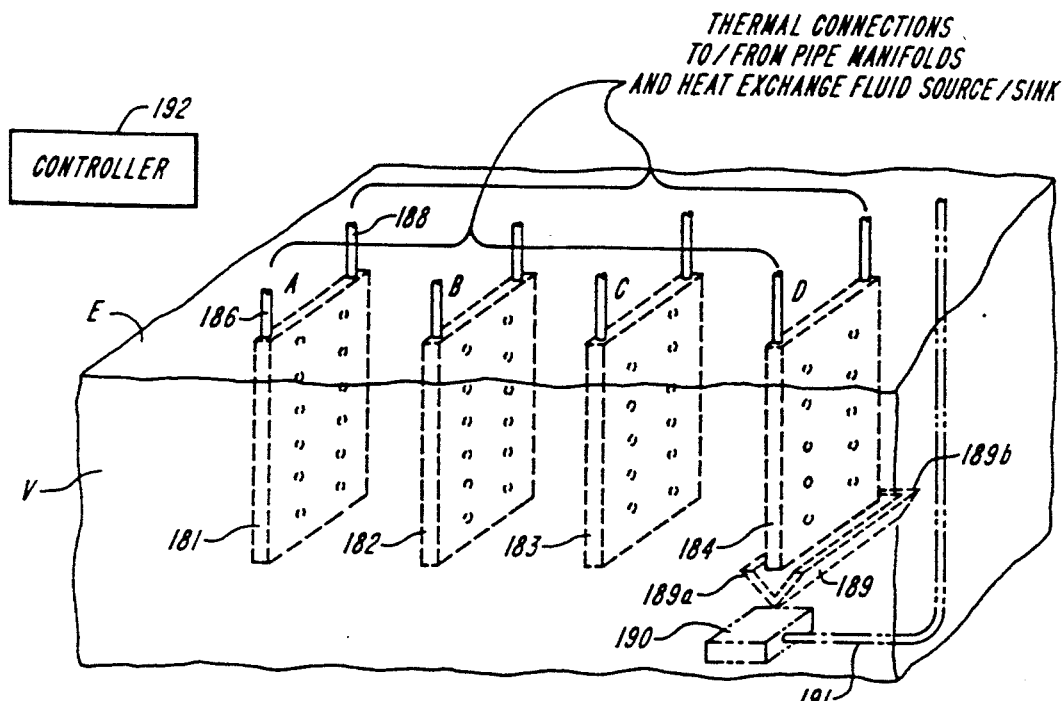
FIG. 6 shows in schematic form a perspective view of an alternative remediation system in accordance with the present invention.
Figure 7:
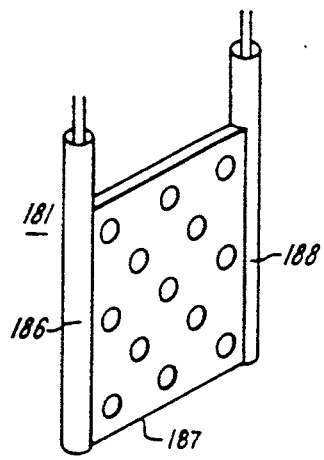
FIG. 7 shows a perspective view of a heat exchanger panel of the system of FIG. 6.

An alternative form of the invention is shown in FIG. 6. In that figure, an array of four heat exchanger (freeze/thaw) plate assemblies (or panels) 181–184 is shown extending into the Earth, downward from a surface region E. The respective panels are spaced apart in the horizontal direction and extend from an input end (panel 181) to an output end (panel 184). As shown in FIG. 7 for exemplary panel 181, the panel 181 includes a first set of heating transfer elements in the form of concentric pipes 186 extending vertically at one side of panel 181, a second set of heat transfer elements in the form of concentric pipes 188 extending vertically at the opposite side of panel 181, and a perforated, substantially planar plate 187 spanning the region between pipe sets 186 and 188. As illustrated, each of the pipe sets 186 and 188 is of the same form as the pipes of heat exchanger 102 of the configuration of FIGS. 4 and 5. While the heat transfer elements are shown vertical, the invention may be configured with such elements angularly offset from vertical.

A collector element 189 in the form of a trough (having a V-shaped cross-section) is disposed beneath the principal plane of the plate of panel 184. The principal axis of element 189 is angularly offset from the horizontal so that end 189a is lower than end 189b. A reservoir assembly 190 underlies the end 189a to collect any liquid phase water that runs down trough 189. The reservoir assembly 190 includes a pump to drive such collected water (and dissolved contaminants) via pipe 191 from the region (V)-to-be-remediated.

Figure 8:
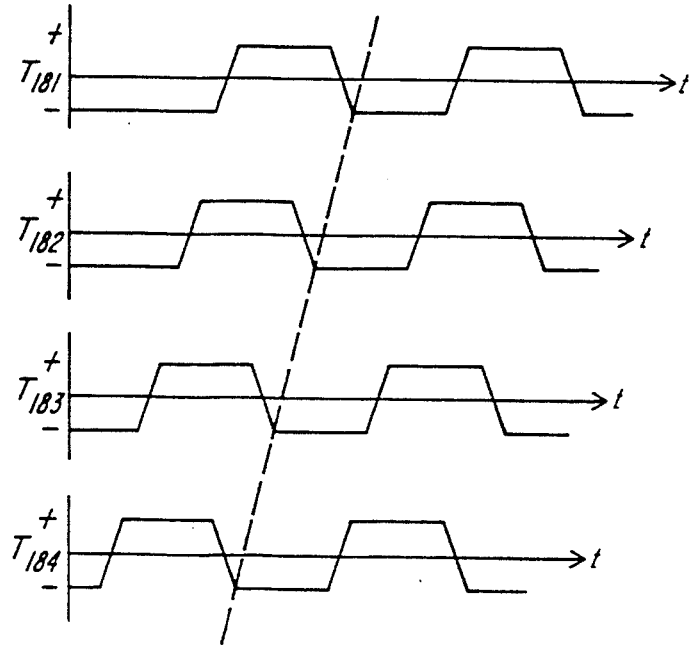
FIG. 8 shows waveforms illustrative of the temperature of the respective heat exchanger panels of the system of FIG. 6.

In operation, a controller 192 controls the flow and temperature of heat exchange fluid through the pipe sets 186 and 188 to effectively control the temperature of panels 181–184. By controlling these temperatures to first freeze and then thaw earth adjacent to the panels on a successively delayed basis, a freeze front is established in the volume V, initially adjacent to panel 181, which is then advanced across the volume V toward the panel 184. By way of example, the temperature of the respective panels is shown as a function of time in FIG. 8. As the freeze-front advances, contaminants in the earth in volume V are drawn toward, and concentrated at, the liquid side of, and driven ahead of, the liquid-solid phase freeze-front as it advances across the volume V. The repetitive nature of the temperature control illustrated in FIG. 8 results in a succession of freeze fronts sweeping across the volume V. Upon heating of the panel 184, the freeze-front melts and the resultant liquid phase water (and dissolved contaminants) flow downward to collector element 187 and in turn to reservoir 190, where that water is pumped from volume V.

To illustrate the effectiveness of the invention, the following calculations give the theoretical performance for a design of the invention consisting of an array of vertical freeze/thaw panels measuring 40 m wide × 3 m high, place 5 m apart. The calculations set forth approximations for the freezing time and power demand as a function of the advance of the freezing front for various conditions of soil moisture and initial soil temperature.

The calculations are based on a one-dimensional approximation of heat transfer with a phase change, known as "Neumann's solution". The formula relates the position of the interface $X(t)$ as a function of time t, to the thermal conductivity K of the frozen ground, the temperature difference $\Delta T$ between the melting temperature $T_m$ and the $T_s$ of the refrigerated plane at $X=0$, and the latent heat/unit volume of the soil $L\rho V_w$, where $V_w$ is the volume fraction of water in the soil. The exact solution for the case of soil initially unfrozen and at the melting point (i.e., where the refrigeration causes freezing only, and does not have to cool the soil to $T_m$) is especially simple; see Eq. (1) below. The exact solution is modified for an initial soil temperature $T_o > T_m$, by a correction factor, as shown in Eq. (2) below. Quantitative illustrations are set forth under simplifying assumptions: energy cost is for refrigeration only, with no allowance for pump loss or heat input from surroundings.

The Neumann solution which assumes that the soil is initially unfrozen, at a temperature $T_o = T_m$, the fusion temperature is:

$$X(t) = [2K\Delta T t / L\rho V_w]^{\frac{1}{2}} \qquad (1)$$

where $X(t)$ = position of interface as function of time
K = thermal conductivity in frozen state
$\Delta T = (T_m - T_s)$, difference between refrigeration and fusion temperatures
$L\rho$ = latent heat of fusion/unit volume
$V_w$ = volume fraction of water A correction for $T_o > T_m$ replaces the latent heat L by an effective value, which includes the sensible heat to cool the soil to the freezing point.

$$L_{eff} = L(1 + c_{21}\Phi S_T + S_T/2) \qquad (2)$$

Where
$c_{21} = c_1/c_2$
subscripts 1, 2 = frozen, unfrozen
$\Phi = (T_o - T_m)/T_m - T_s)$
$S_T = c_1(T_m - T_s)/L\rho V_w$ The instantaneous power demand is given by $$P = AL\rho V_w(dX/dt) \qquad (3)$$

The following design and field conditions are used in this exemplary computation:
freeze/thaw panels 40 m × 3 m, 5 m apart soil and temperature parameters: $T_s = -35°$ C.; $V_w = 0.15$; $K_1 = 6.4 \times 10^{-3}$ J/cm deg; $L\rho = 305$ J/cm³

Table 1 sets forth the freezing time and power versus interface distance; $T_o = T_m$

TABLE 1

| $X(t)$, cms | Time t | P, KWatt |
|---|---|---|
| 20 | 11.4 hrs | 13.4 |
| 50 | 2.96 d | 5.38 |
| 100 | 11.8 d | 2.69 |
| 200 | 47.3 d | 1.35 |
| 300 | 106 d | 0.90 |
| 400 | 189 d | 0.67 |
| 500 | 296 d | 0.54 |

Table 2 sets forth the effect of soil moisture on freezing $X(t)$ (cms) for three values of $V_w$.

TABLE 2

| Time t | $V_w = 0.05$ | $V_w = 0.15$ | $V_w = 1$ |
|---|---|---|---|
| 1 hour | 7.45 | 5.75 | 4.3 |
| 1 day | 36.5 | 28.1 | 21.1 |
| 1 month | 202. | 155. | 117. |
| 1 year | 698. | 539. | 404. |

Table 3 sets forth the effect of initial soil temperature on $X/X_o$, where $X_o$ is calculated for $T_o = T_m$.

TABLE 3

| $T_o$ °F. | $X/X_o$ |
|---|---|
| 32 | 1.0 |
| 40 | 0.95 |
| 50 | 0.89 |

The total energy to freeze over the full five meter distance between panels is $2.75 \times 10^{10} J = 7,640$ KWH. At $0.06/KWH, the cost is $459., a unit cost of $0.77/m^3 = \$0.59$/cubic yard. This assumes $T_o = T_m$; for higher initial soil temperature, the energy cost will be somewhat greater; the factor of increase depends on $V_w$; for $T_o = 40°$ and $V_w = 0.15$, the cost is increased by 10%.

Remediation can vary greatly, depending on the type of soil, $V_w$, the nature of the contaminants and the speed of cooling. For an indication of the remediation ratio, there exist reports of segregation coefficients measured in different systems: residues of explosives chemicals in soil, simple salts in bulk $H_2O$, and mineral salts in soil. The segregation (or cleanup) factors vary from less than $10^{-3}$ to 0.16. For a factor 0.1 (near the maximum of the range), the cleanup ratio after four passes is $10^{-4}$. This would correspond to a reduction of a contamination level from 100 ppm to 10 ppb. At the calculated freezing rate given in Table 1, this could be achieved in 6.5 years.

Figure 9:
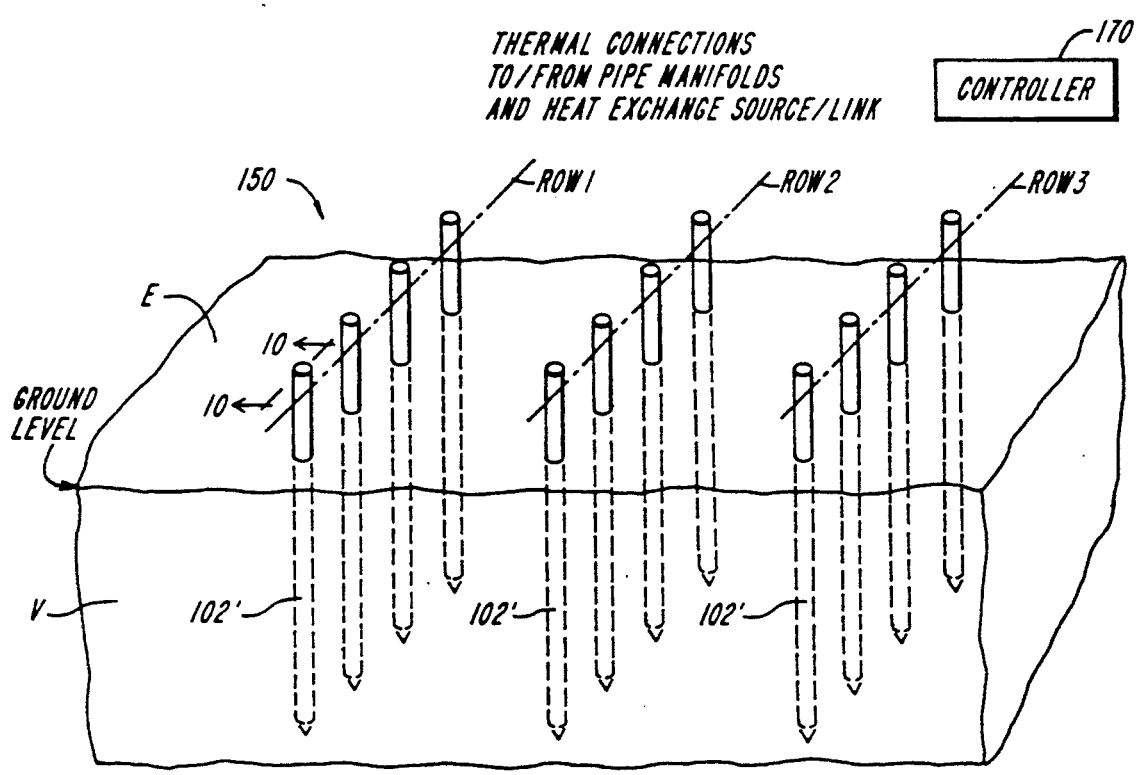
FIG. 9 shows in schematic form a perspective view of an alternative remediation system in accordance with the present invention.
Figure 10:
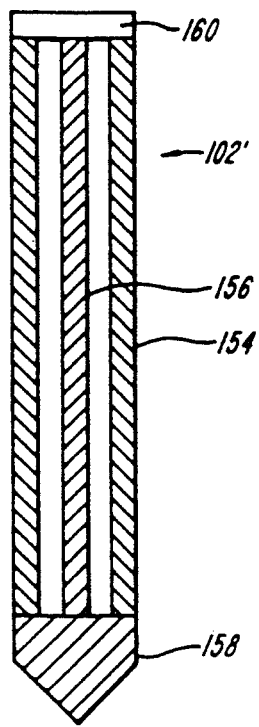
FIG. 10 shows a sectional view along lines B—B of a heat exchanger element of the system of FIG. 9, with a drive tube for assisting in insertion into the ground.

In an alternate form of the invention, an array of elongated heat exchangers may be established in the Earth, wherein the heat exchangers of the array extend downward from a surface region E and into a sub-surface volume (V)-to-be-remediated. In one such system, illustrated in FIG. 9, an array 150 of heat exchangers includes three rows of four exchangers. Each of the heat exchangers may be of the same type as heat exchanger 102 of the embodiment of FIG. 5. Alternatively, each heat exchanger may be of the type shown in section in FIG. 10, denoted by reference designation 102'. In that figure, a cylindrical drive tube 154 is coaxially disposed about an elongated cylindrical central element 156. A pointed tip, or auger, element 158 is disposed at the distal tip of exchanger 102, and drive element 160 is disposed at the proximal end. In the preferred form, the tube 154 is hardened stainless steel, central element 156 is copper or aluminum (or other high thermal conductivity metal), tip element 158 is hardened stainless steel, and drive element 160 is hardened stainless steel. Other materials may be used in alternative embodiments. With this configuration, the heat exchangers 102' are adapted of implantation in the Earth using conventional driving techniques, permitting rapid, inexpensive implementation.

Following implantation, the drive element 160 and tube 154 is withdrawn, leaving the highly conductive central element 156 in place. A controller 170 is adapted to selectively control the temperature of the various central elements of the heat exchangers, as in a phased array, to establish controlled and directed freeze fronts passing through the region of the Earth underlying surface region E and disposed about the array 150. As with conventional phased arrays, the resolution of the array is a function of the inter-element spacing of the array of heat exchangers. In one form of operation, the rows of the array are alternatively heated and cooled to establish a substantially planar freeze-front which initially extends across the first row through the volume V and then advances to the second row, and finally advances to the last row. Behind the freeze-front, the heat exchangers are heated to cause melting in that portion of volume V. This alternate heating and cooling of the heat exchangers establishes a succession of freeze-fronts passing, or sweeping, across the sub-surface volume V disposed about the array 150. Contaminants in that volume are driven ahead of each freeze-front and concentrated at the distal end of the volume, i.e., adjacent to Row 3 at array 150, thereby establishing repetitive remediating action in the Earth. Upon heating of the elements of Row 3 in a manner thawing the Earth adjacent thereto, the concentrated contaminants may be collected and extracted from the Earth, for example, using collection pipes in the same manner as in the pipes 111-116 of the configuration of FIGS. 4 and 5.

The invention is described above as being effective for the in situ removal of contaminants from, i.e., remediating, regions of the Earth, where the contaminants are mobile, for example, soluble in water. However, the invention may also be used to remove immobile contaminants, such as insoluble precipitates or films adsorbed onto soil grains. In this form of the invention, prior to advancing the freeze-front across the region-to-be-remediated, a solubilizing agent is first injected into the region, whereupon that agent serves to make the previously immobile contaminants mobile. Then, the freeze-front sweeping process may be accomplished in the manner described above.

In addition, while the above description is in terms of "contaminants" and "remediation" it will be understood that such contaminants may include valuable materials, such as oil, which may be recovered using the invention, thereby "remediating" the "contaminated" region of the Earth. As used herein, the term "contaminants" refers to any material that may be removed from the Earth using the invention, and the term "remediation" refers to the removal of any such material. Thus, general soil "washing" is contemplated, as well as operations such as extraction of oil, minerals (e.g., from tailings or deposits), and bioremediation (at any desired temperature).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for remediating contaminated earth in situ, comprising the sequential steps of:
    A. utilizing a heat transfer assembly to establish an advancing freeze-front in a moist region adjacent to said assembly, said freeze-front advancing away from said assembly and toward a collection zone in said region, said moist region being substantially frozen on a first side of said freeze-front and being substantially unfrozen on a second side of said freeze-front and said freeze-front being the solid-liquid interface between said frozen and unfrozen portions of said moist region, and utilizing said heat transfer assembly to freeze said moist region between said heat transfer assembly and said freeze-front, said region being in or adjacent to said contaminated earth, whereby contaminants in said contaminated earth migrate toward said freeze-front to establish a relatively high concentration of contaminants adjacent to the leading edge of and on said second side of said freeze-front, and B. collecting and removing liquid phase water and concentrated contaminants from said collection zone.

2. The method of claim 1 comprising the further step of:

between steps A and B utilizing a heat source in or near said collection zone to melt a leading edge of said freeze-front and establish liquid phase water and concentrated contaminants in said collection zone.

3. The method of claim 1 wherein said moist region is a porous medium overlying said contaminated earth.

4. The method of claim 1 wherein said moist region is at least partially within said contaminated earth.

5. The method of claim 1 comprising the further steps of:

C. utilizing a heat source to melt said freeze-front and said moist region between said heat transfer assembly and said freeze-front, and D. repeating steps A, B and C in sequence.

6. The method of claim 5 wherein said moist region is a porous medium overlying said contaminated earth.

7. The method of claim 5 wherein said moist region is at least partially within said contaminated earth.

8. The method of claim 5 comprising the further step of:

E. separating said removed water from said removed contaminants.

9. The method of claim 8 comprising the further step of:

F. returning said separated water to said contaminated earth.

10. The method of claim 1 comprising the further step of:

prior to said step A, adding liquid phase water to said contaminated earth.

11. The method of claim 1 comprising the further step of:

prior to step A, adding solubilizing agent to said contaminated earth.

12. The method of claim 2 wherein said moist region is a porous medium overlying said contaminated earth.

13. The method of claim 2 wherein said moist region is at least partially within said contaminated earth.

14. The method of claim 2 comprising the further steps of:

C. utilizing a heat source to melt said freeze-front and said moist region between said heat transfer assembly and said freeze-front, and D. repeating steps A, B and C in sequence.

15. The method of claim 14 wherein said moist region is a porous medium overlying said contaminated earth.

16. The method of claim 14 wherein said moist region is at least partially within said contaminated earth.

17. The method of claim 14 comprising the further step of:

E. separating said removed water from said removed contaminants.

18. The method of claim 17 comprising the further step of:

F. returning said separated water to said contaminated earth.

19. The method of claim 2 comprising the further step of:

prior to step A, adding liquid phase water to said contaminated earth.

20. The method of claim 2 comprising the further step of:

prior to step A, adding solubilizing agents to said contaminated earth.

21. A system for remediating contaminated earth in situ, comprising:

A. a heat transfer assembly disposed in a moist, porous transfer medium and including means for advancing a freeze-front in a region of said medium adjacent to said assembly toward a collection zone in said region, said assembly being disposed in or adjacent to said contaminated earth, B. a collection assembly disposed in said collection zone and including means for removing liquid phase water and contaminants dissolved therein from said collection zone.

22. A system according to claim 21 further comprising:

C. a heat source disposed on or near said collection zone and including means for selectively heating said freeze-front as it approaches said collection zone.

23. A system according to claim 22 wherein said heat transfer assembly comprises:

i. a substantially planar array of elongated, substantially parallel tubular elements and associated means for passing a heat exchange fluid through said tubular elements, each of said tubular elements being elongated along a principal axis, said array being positioned with its principal plane nominally horizontal with a slight angular offset about one end of said array, and ii. means for selectively controlling the temperature of, and driving said heat exchange fluid through, said tubular elements, and wherein said collection assembly comprises:

i. a substantially planar array of elongated, substantially parallel collector elements, each of said collector elements being elongated along a principal axis and having an upward-facing J- or V-shaped cross-section transverse to its principal axis and underlying and having its principal axis substantially parallel to the principal axis of an associated one of said tubular elements, and ii. a collection manifold and associated pump assembly, said collection manifold having an input port coupled to the lowermost end of each of said collector elements and an output port coupled to said pump assembly.

24. A system according to claim 23 wherein said heat source comprises:

i. a substantially planar array of elongated substantially parallel heating elements, each of said heating elements being elongated along a principal axis, said array being positioned substantially parallel to said array of tubular elements and between said array of tubular elements and said array of collection elements, and ii. means for selectively controlling the temperature of said heating elements.

25. A system according to claim 23 wherein said medium is distinct from and positioned above said contaminated earth.

26. A system according to claim 25 wherein said medium is selected from the group consisting of fine silt and sand.

27. A system according to claim 23 wherein said medium is at least partially integral with said contaminated earth.

28. A system according to claim 24 wherein said medium is distinct from and positioned above said contaminated earth.

29. A system according to claim 28 wherein said medium is selected from the group consisting of fine silt and sand.

30. A system according to claim 24 wherein said medium is at least partially integral with said contaminated earth.

31. A system according to claim 22 wherein said region of said medium is integral with said contaminated earth, and
wherein said heat transfer assembly comprises:
  i. an elongated heat transfer tubular element and associated means for passing a heat exchange fluid through said tubular element, said tubular element being elongated along a principal axis, said tubular element being positioned with its principal axis nominally vertical, and
wherein said collection assembly comprises:
  i. a plurality of elongated collector elements, each of said collector elements being elongated along a principal axis substantially parallel to said principal axis of said tubular element and said collector elements being radially displaced from said principal axis of said tubular element, each of said collector elements having an inner non-porous tubular element disposed coaxially within an outer, porous tubular element, said inner tubular element having an opening to its interior near its lowermost end, thereby establishing a flow path for liquid phase water and contaminants dissolved therein from regions adjacent to and exterior to said outer tubular element to the interior of said inner tubular element, and
  ii. pump means for extracting liquid phase water and contaminants dissolved therein from said interior of said inner tubular element.

32. A system according to claim 31
wherein said heat source comprises:
  i. a plurality of elongated heating transfer elements, each of said heating elements being elongated along a principal axis substantially parallel to said principal axis of said heat transfer tubular element and being between said heat transfer tubular element and said collector elements, and
  ii. means for controlling the temperature of said heating elements.

33. A system according to claim 22
wherein said heat transfer assembly comprises:
  i. a plurality of planar plate assemblies, each of said plate assembly including a pair of spaced apart elongated heat transfer elements said heat transfer elements being elongated along substantially parallel, nominal vertical principal axes, and a substantially planar porous plate disposed about a principal plane extending between and being in thermal contact with said heat transfer elements wherein the plates of said plate assemblies are substantially parallel and spaced apart in a horizontal direction, and from an input end to an output end,
  ii. means for controlling the temperature of said heat transfer elements.

34. A system according to claim 33
wherein said collection assembly comprises:
  i. an elongated collector element, said collector element elongated along a principal axis and having an upward-facing U- or V-shaped cross-section transverse to its principal axis and underlying the plate assembly nearest said output end whereby said principal axis of said collector element is substantially parallel to the principal plane of said plate of said plate assembly nearest said output end, said principal axes of said collector element having an angular offset from the horizontal direction,
  ii. pump for extracting said liquid phase water and contaminants dissolved therein from said reservoir.

35. A system according to claim 22
wherein said heat transfer assembly comprises:
  i. an array of elongated heat transfer elements, each of said heat transfer elements being elongated along a nominally vertical principal axis,
  ii. an array temperature controller including means for selectively controlling the temperature of said heat transfer elements whereby a directionally controlled and shaped advancing freeze-front may be established in said region.

* * * * *